United States Patent [19]

Mulee et al.

[11] 4,271,626

[45] Jun. 9, 1981

[54] INSECT ELECTROCUTION APPARATUS

[75] Inventors: Dennis L. Mulee, 304 Samoset La., Schaumburg, Ill. 60172; Arthur R. Erbach, Des Plaines; Frank Ray, Schaumburg, both of Ill.

[73] Assignee: Dennis L. Mulee, Schaumburg, Ill.

[21] Appl. No.: 73,675

[22] Filed: Sep. 10, 1979

[51] Int. Cl.³ .......................... A01M 1/22; H01B 17/00
[52] U.S. Cl. .................................. 43/112; 174/138 R
[58] Field of Search .............. 43/44.95, 112; 336/207; 338/304, 321; 24/73 PF, 216, 217; 174/138 R, 158 F, 160, 163 F

[56] References Cited

U.S. PATENT DOCUMENTS

| | | | |
|---|---|---|---|
| 1,985,921 | 1/1935 | Folmer | 43/112 |
| 2,348,918 | 5/1944 | Matthes | 174/160 |
| 2,984,698 | 5/1961 | Strauss | 174/138 R |
| 3,357,292 | 12/1967 | Falkenberg | 24/73 PF |
| 3,823,506 | 7/1974 | Iannini | 43/112 |
| 3,835,577 | 9/1974 | Soulos | 43/112 |
| 3,894,351 | 7/1975 | Iannini | 43/112 |
| 3,913,888 | 10/1975 | Maranell | 174/158 F |
| 3,986,292 | 10/1976 | Klebanoff | 43/112 |
| 4,121,371 | 10/1978 | Kaphengst | 43/112 |
| 4,158,268 | 6/1979 | DeYoreo | 43/112 |

FOREIGN PATENT DOCUMENTS 1016302  1/1966  United Kingdom ................ 174/163 F

*Primary Examiner*—Nicholas P. Godici
*Assistant Examiner*—K. Bradford Adolphson
*Attorney, Agent, or Firm*—George H. Gerstman

[57] ABSTRACT

Insect electrocution apparatus having a first wire mesh formed of perpendicularly crossed wires spaced from a second wire mesh formed of perpendicularly crossed wires. The spacing device comprises a main body portion having a length equal to the spacing distance with a pair of bosses extending axially from the opposite ends of the main body portion. Each of the bosses defines a slot which receives a wire from a respective wire mesh, and the wire meshes are retained in place with respect to the main body portion. One of the wire meshes is mounted to a chassis plate by means of a grid support formed of insulative material. The grid support is an elongated member having a first portion for connection to the grid and a second portion for connection to the chassis plate. The first portion defines a pair of perpendicularly-oriented slots for receiving adjacent horizontal wires of the grid and the second portion extends through a chassis plate opening and forms a retaining member on the side of the chassis plate opening opposite the wire mesh side.

22 Claims, 14 Drawing Figures

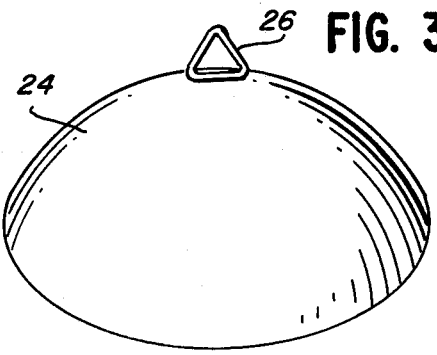
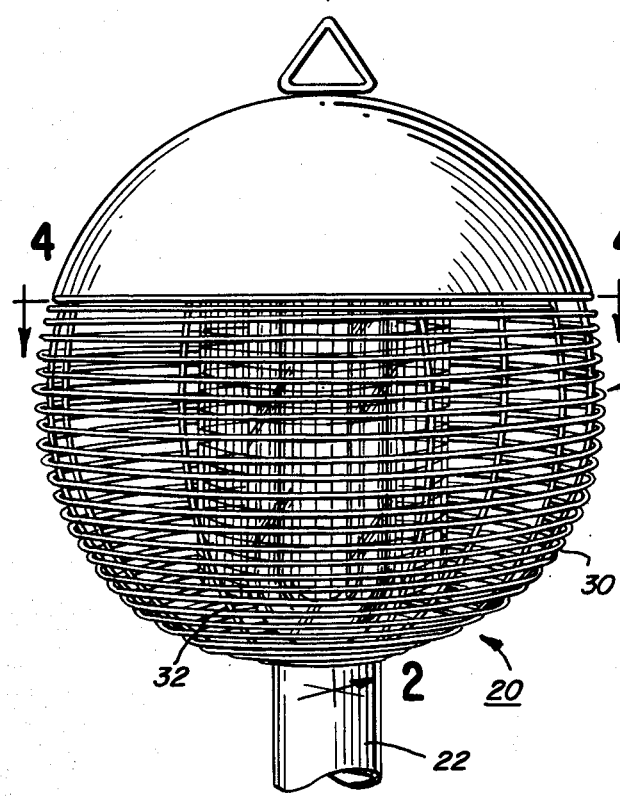
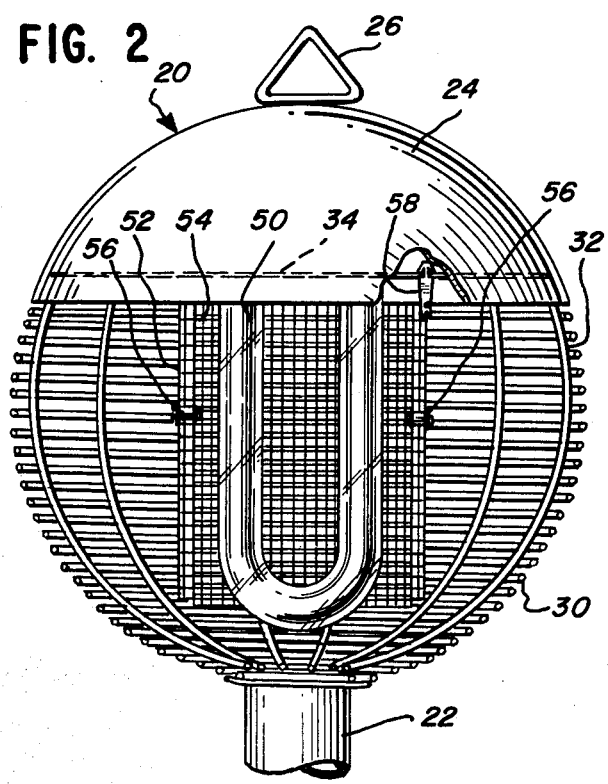
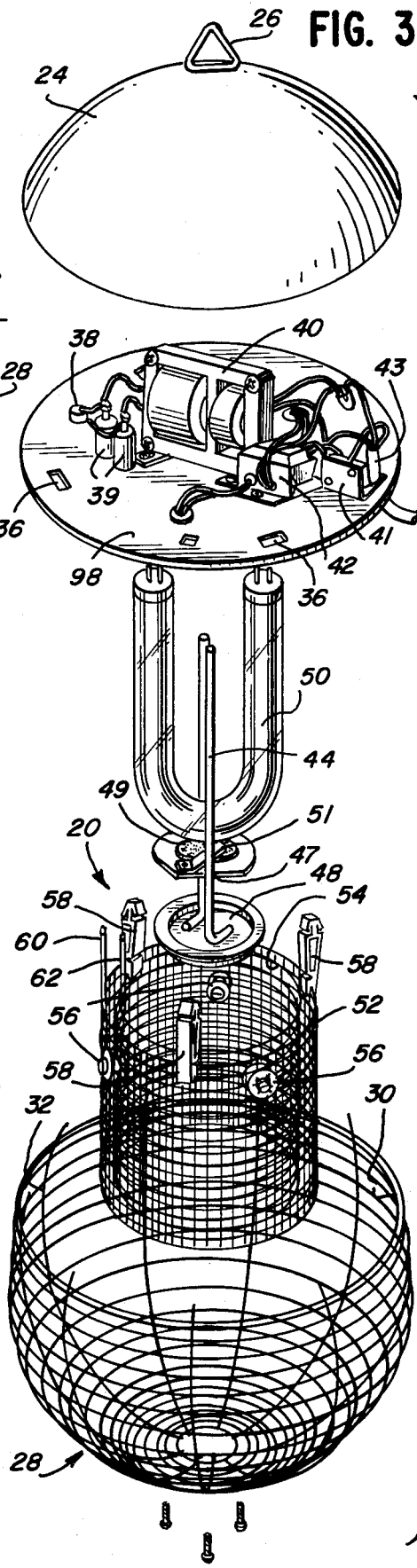

1

INSECT ELECTROCUTION APPARATUS

BACKGROUND OF THE INVENTION

The present invention is particularly suited for use with insect electrocution apparatus, and concerns a novel spacing device for spacing a first wire mesh formed of perpendicularly crossed wires from a second wire mesh formed of perpendicularly crossed wires. The present invention also concerns a novel support for mounting the mesh grid of insect electrocution apparatus to a chassis plate.

Insect electrocution apparatus is well-known in which insects are attracted by means of a light source and are killed as they attempt to reach the light source when they short out a high voltage electrical field surrounding the light source. The vast majority of insects are attracted by light in the ultraviolet portion of the color spectrum. Researchers have determined that the most attractive light source to the majority of insects is one which has its peak output at a wavelength of 360 nanometers. This is the near ultraviolet region of the spectrum generally referred to as "black light." Most black light lamps are of the fluorescent type, and use special phosphors to produce the desired wavelength light output. Black light lamps have been used for many years to attract insects for field surveys of insect populations and other studies.

In the known type of insect electrocution apparatus, in order to electrocute the insect a pair of concentric grids is typically placed around the black light source. The insects must pass through the grid pair ot reach the lamp. A high voltage alternating current source is connected across the grid pair (normally 2,000 to 5,000 volts) to establish a high potential electrical field between the grids. The spacing between grids is set to be great enough to prevent an arc breakdown of this field unless some electrically conductive mass enters the field and effectively shortens the air gap sufficiently to cause an arc breakdown. The body of an insect contains fluids which are electrically conductive, and thus the insect "shorts" the field as it passes through the grid, causing an arc breakdown and passing a high electrical discharge through the insect.

It has been found to be very desirable that the spacing between grids be uniform throughout, that the grid clamping have maximum rigidity and that the grid pair be secured so that it is vibration resistant. Further, it is desirable that the grid pair be constructed to enable simple assembly techniques and that the grid pair have maximum open area to allow insect entry, but the grid element conductors must be close enough to provide a "shortable gap."

Typically each of the grid elements comprises a wire mesh formed of perpendicularly crossed wires. It is an object of the present invention to provide a spacing device for providing uniform spacing of a pair of wire meshes.

Another object of the present invention is to provide a spacing device which achieves rigid clamping of the wire mesh elements.

A further object of the present invention is to provide a spacing device formed of an insulating material which enables a pair of wire meshes to be assembled simply and rapidly.

A further object of the present invention is to provide a spacing device that is useful to space the grid pair of insect electrocution apparatus and allows the grids to be offset with respect to each other to reduce the possibility of an insect passing through without shorting the field.

Another object of the present invention is to provide a spacing device that may be secured so that it is vibration resistant to reduce the shipping loss of fasteners.

A further object of the present invention is to provide a grid support for enabling the secure attachment of the grid assembly to the unit chassis in an insect electrocution apparatus.

A still further object of the present invention is to provide a grid support useful in insect electrocution apparatus formed of an insulating material suitable for the voltages used in such apparatus.

A further object of the present invention is to provide a grid support which is simple in construction and easy to manufacture.

Another object of the present invention is to provide a grid support used in insect electrocution apparatus which is simple and easy to install or to remove for servicing.

A still further object of the present invention is to provide a grid support used in insect electrocution apparatus which is vibration resistant to reduce the possibility of shipping damage.

A further object of the present invention is to provide insect electrocution apparatus utilizing a pair of electrically conductive grid elements which are spaced by a number of insulative spacing devices and are coupled to a chassis plate by means of insulative grid supports.

Other objects and advantages of the present invention will become apparent as the description proceeds.

SUMMARY OF THE INVENTION

In accordance with the present invention, a spacing device is provided for spacing a first wire mesh formed of perpendicularly crossed wires from a second wire mesh formed of perpendicularly crossed wires. The spacing device comprises a main body portion having a length that is substantially equal to the distance of spacing of the first mesh from the second mesh. A pair of bosses extend axially from opposite ends of the main body portion. Each of the bosses defines a slot adapted for receiving a wire from a respective wire mesh. The width of each boss is no greater than the distance between two adjacent wires extending in a direction perpendicular to the slot direction. Means are provided for retaining the first wire mesh and the second wire mesh in place with respect to the main body portion.

In the illustrative embodiment, the main body portion is cylindrical and is formed of an electrically insulative material. The bosses are each identical to the other and are perpendicularly-oriented with respect to each other at opposite ends of the main body portion. Each of the bosses has a pair of arcuate opposed sides and a pair of planar opposed sides connecting the arcuate opposed sides. The slot defined therein extends from one of the planar sides to the opposite planar side, and the width of each boss comprises the distance between opposed planar sides.

In the illustrative embodiment, the means for retaining the wire meshes in place comprise spring washers that are forced over each of the bosses to compress the wire meshes against the ends of the main body portion.

In accordance with a further aspect of the invention, a grid support is provided for mounting a mesh grid formed of perpendicularly crossed electrically conductive wires to a chassis plate of insect electrocution apparatus. The grid support is formed of insulative material and comprises an elongated member having a first portion for connection to the grid and a second portion for connection to the chassis plate. The first portion defines a pair of generally perpendicularly-oriented slots open to the outside of the first portion with the slots receiving therein adjacent, spaced, horizontal wires of the grid. The second portion extends through an opening in the chassis plate and includes spring means for forming a retaining member on the side of the chassis plate opposite to the grid side.

In the illustrative embodiment, the grid support is formed as an integral one-piece member with a first portion having a smaller cross-sectional dimension than the second portion. One of the slots is vertically oriented and opens at an end of the first portion and the other slot is horizontally oriented and opens at a location along the elongated member that is toward the second portion. The apexes of the slots lie along a line and are spaced a distance that is substantially equal to the spacing of two adjacent horizontal wires received within the slots.

In the illustrative embodiment, the spring means which form a retaining member comprises a pair of resilient fingers that squeeze inward to be inserted into the chassis plate opening in one direction and spring outwardly to form retaining shoulders on the opposite side of the chassis plate.

A more detailed explanation of the invention is provided in the following description and claims, and is illustrated in the accompanying drawings.

BRIEF DESCRIPTION OF THE DRAWINGS

FIG. 1 is a front elevational view of insect electrocution apparatus constructed in accordance with the principles of the present invention;

FIG. 2 is a cross-sectional view thereof, taken along the plane of the line 2—2 of FIG. 1;

FIG. 3 is an exploded perspective view of the insect electrocution apparatus of FIG. 1;

DETAILED DESCRIPTION OF THE ILLUSTRATIVE EMBODIMENT

Figure 4:
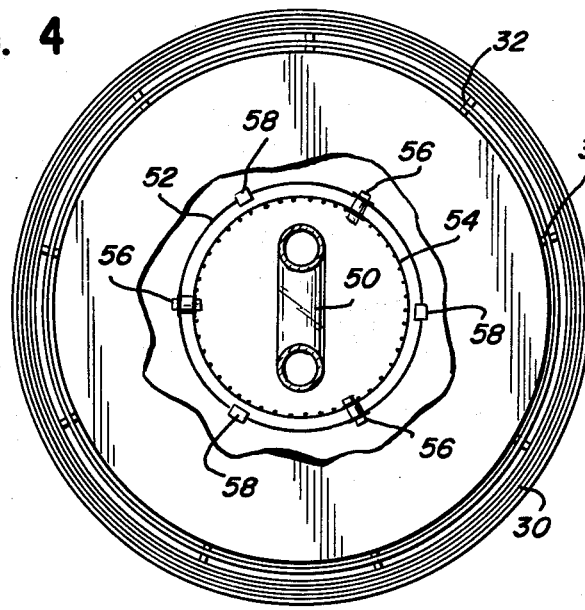
FIG. 4 is a cross-sectional view of the insect electrocution apparatus illustrated in FIG. 1, taken along the plane of the line 4—4 of FIG. 1.

Referring to FIGS. 1-4 of the drawings in particular, insect electrocution apparatus 20 is illustrated therein as being supported on a post 22 and having a generally spherical external appearance. Apparatus 20 comprises a dome 24 to which a hanging loop 26 is connected and an outer cage 28 formed of a spiral generally horizontal winding 30 with spaced upright connecting wires 32.

Within the outer shell comprising dome 24 and outer cage 28, there is mounted a chassis plate 34 defining three equally spaced openings 36 and carrying on its top side capacitor 38, high voltage leads 39, transformer 40, microswitch and bracket 41, ballast 42 and AC line cord 43. On its underside, chassis plate 34 carries harp assembly 44, bulb support 46, and harp base 48. An ultraviolet black light bulb 50 is provided for connection to suitable receiving members also carried on the underside of the chassis plate.

Bulb support 46 defines a pair of opposed slots 47 for guiding bulb support 46 on the harp assembly 44. Support 46 carries a cushion 49 on its top surface for supporting the underside of bulb 50, and also has riveted thereto a pair of opposed leaf springs 51. Each of the leaf springs defines a slot into which the harp assembly 44 is received and forms a spring-locking device to create a wedge lock. Thus during shipping, downward forces or vibrations tend to add to the locking force of the leaf spring against the rods which form the harp assembly 44. The affect of this construction is to provide a simple yet highly effective support system for bulb 50 so that the unit can be transported with bulb 50 in place.

Bulb 50 is surrounded by a pair of concentric electrically conductive grids 52, 54, each of which comprises an electrically conductive wire mesh formed of perpendicularly crossed wires. Grids 52, 54 are generally circular in cross-sectional configuration and are evenly spaced from each other by means of three equally spaced grid spacers 56, which will be described in detail below. Outer grid 52 is connected to chassis plate 34 by means of three equally spaced grid support members 58, which will be described in detail below. Outer grid 52 has a steel rod 60 welded thereto while inner grid 54 has a steel rod 62 welded thereto. These steel rods pass through insulating bushings in the chassis for connection to high voltage leads 39 which are coupled to the high voltage transformer. This connection of the grids to the high voltage transformer eliminates the necessity to use electrical wire with high voltage insulation and screw terminals at each grid.

Each of the grids 52, 54 is formed of $\frac{1}{2}''\times\frac{1}{2}''$ square wire mesh and the grids are spaced from each other a distance of slightly less than $\frac{1}{2}$ inch I.D. The device 56 for spacing the grids 52, 54 from each other will now be described, with particular reference to FIGS. 6-14.

Referring now to FIGS. 6-10, spacing device 56 shown therein is formed of an insulating material, such as steatite ceramic, preferably impregnated with a hydrophobic material, such as Dow-Corning DC 200. Spacer 56 comprises a main body portion 66 that is cylindrical and has a length that is equal to the internal dimension distance of spacing of mesh 52 from mesh 54. As a specific example, although no limitations are intended, a main body length of 0.41 inch has been found useful for providing the proper spacing of grids 52, 54 in an insect electrocution apparatus.

A pair of bosses 68, 70 extend axially from opposite ends of main body portion 66. Boss 68 defines a horizontal slot 72 while boss 70 defines a vertical slot 74. Each boss 68, 70 is identical to the other and is perpendicularly-oriented with respect to the other at opposite ends of main body portion 66.

Figure 6:
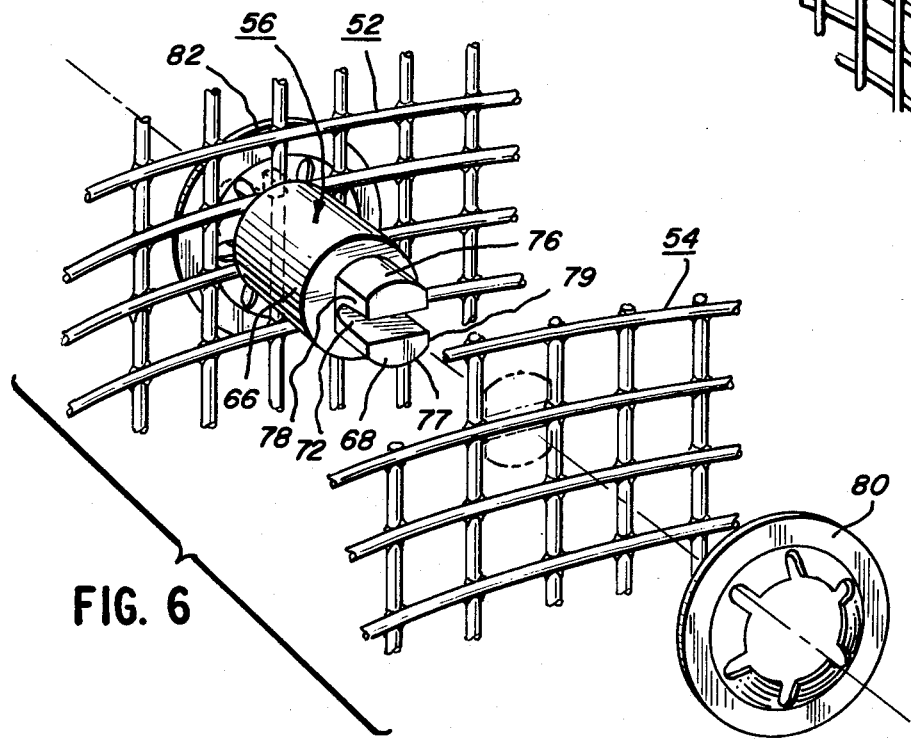
FIG. 6 is a partially exploded perspective view of a spacing device constructed in accordance with the principles of the present invention, illustrating how the spacing device spaces one mesh from another mesh.
Figure 7:
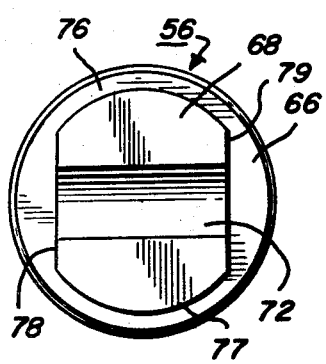
FIG. 7 is a front view of a portion of a spacing device constructed in accordance with the principles of the present invention.
Figure 8:
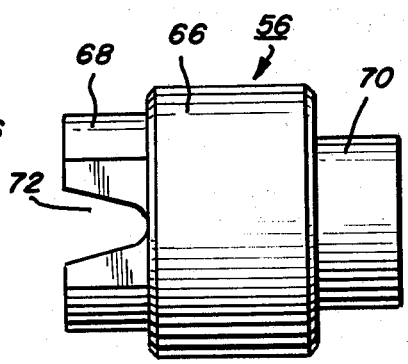
FIG. 8 is a side elevational view thereof.

Referring to FIGS. 6 and 7, it is seen that boss 68 has a pair of arcuate opposed sides 76, 77 and a pair of planar opposed sides 78, 79 connecting the arcuate opposed sides 76, 77. Slot 72 defined by boss 68 extends from planar side 78 to planar side 79 and the width of the boss 68 comprises the distance between planar sides 78 and 79.

Figure 9:
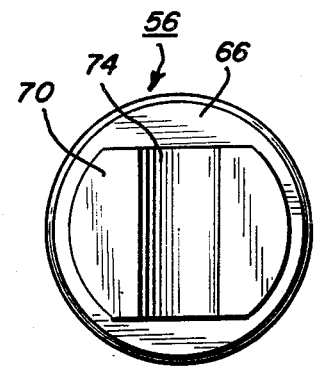
FIG. 9 is a rear view thereof.
Figure 10:
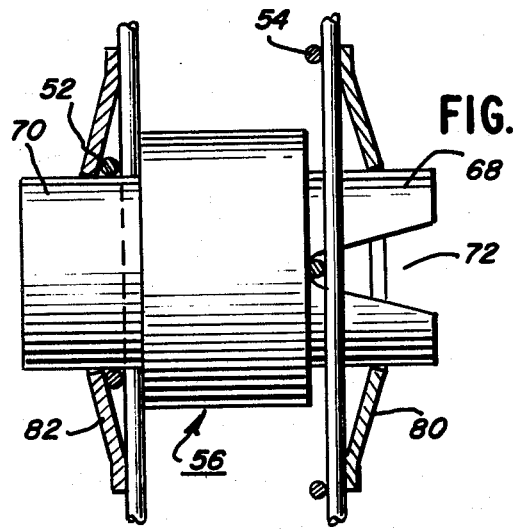
FIG. 10 is a side elevational view of a spacing device constructed in accordance with the present invention, showing its connection with respect to a pair of wire meshes illustrated in cross-section.
Figure 11:
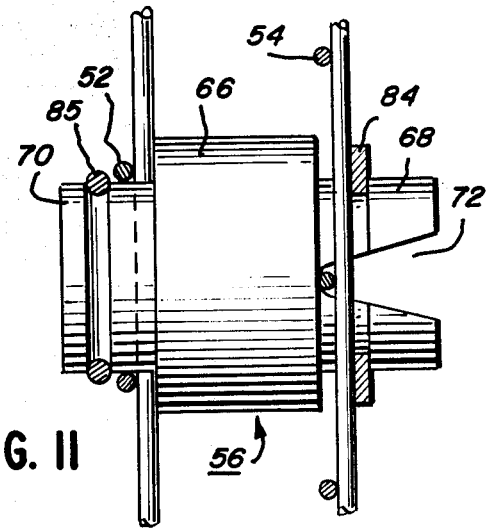
FIG. 11 is similar to FIG. 10, but showing the spacing device with a different type of retaining means.

Boss 70, illustrated in FIG. 9, is identical in construction to boss 68, but is perpendicularly-oriented with respect thereto.

It can be seen that the opposite ends of main body portion 66 provide stable shoulders for meshes 54 and 52 to rest on, and establish the grid gap. Slots 72 and 74 defined by the respective bosses allow the grids to be positioned with both vertical and horizontal offsets of one-half grid space. This offset forms the maximum obstruction to a clear flight path for an entering insect, and thus will cause the highest electrocution rate.

Figure 12:
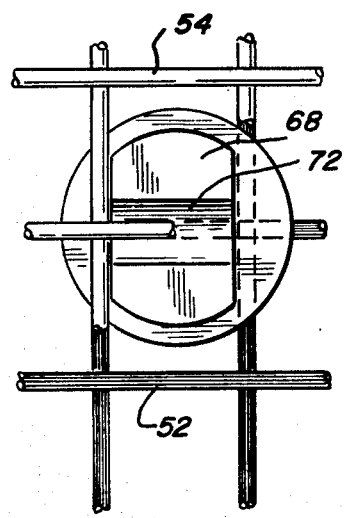
FIG. 12 is a front view of a spacing device showing one form of connection of a pair of meshes.
Figure 13:
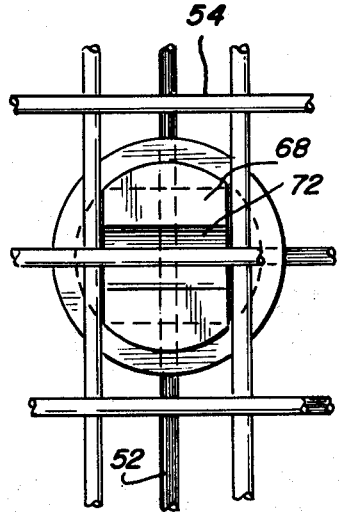
FIG. 13 is a view of the spacing device of FIG. 12, but showing another form of connection of a pair of meshes.
Figure 14:
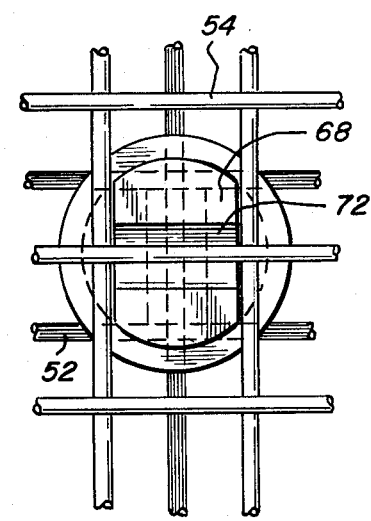
FIG. 14 is a view of a spacing device showing a further form of connection of a pair of meshes.

Various manners of spacing the grids can be discerned by viewing FIGS. 12-14. In FIG. 12, grids 52 and 54 are generally aligned with each other while in FIG. 13 the horizontal wires of grid 52 are aligned with the horizontal wires of grid 54 and the vertical wires of grid 52 are offset one-half grid space from the vertical wires of grid 54. In the FIG. 14 construction, both the horizontal and vertical wires of grids 52 and 54 are offset one-half grid space from each other.

In order to space grids 52 and 54 from each other in a rigid manner, spacer 56 is placed between the grids as illustrated in FIG. 6 and the grids are aligned with respect to the bosses in the desired manner. A retaining spring washer (push-nut) 80 is pressed over boss 68 and a retaining spring washer 82 is pressed over boss 70, with the result being illustrated in FIG. 10. It can be seen from FIG. 10 that the grid meshes are locked against the opposite ends of the main body portion 66 with a residual spring force. Because of the tubular form of the two grids 52, 54, three such spacers 56, secured as indicated in FIGS. 3 and 4, are sufficient to create a rigid, properly spaced electrocution grid assembly. No other fastening means are needed to keep the grids spaced, and the grids may be supported as a unit.

Other retaining means than spring washers may be used, if desired. For example, in FIG. 11, a "hairpin" type clip 84 is shown for retaining grid 54 against one end of main body portion 66 and a retaining ring 86 is shown for retaining grid 52 against the other end of main body portion 66.

Figure 5:
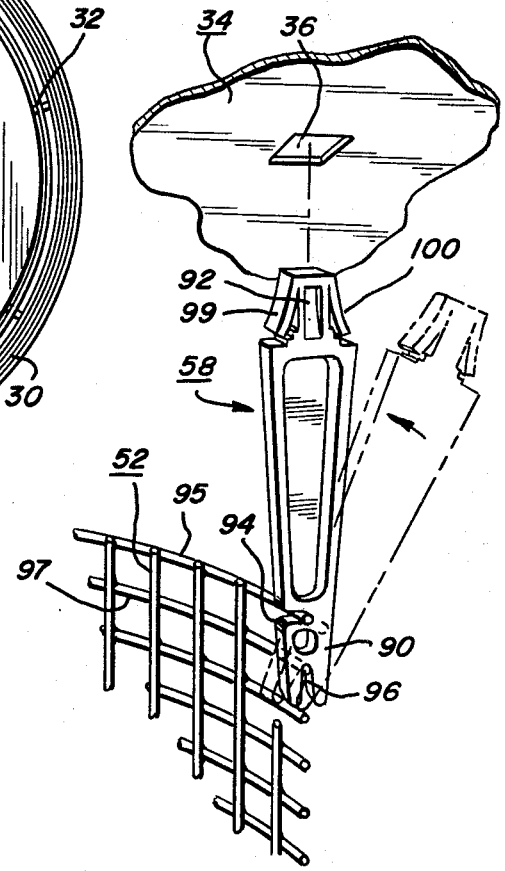
FIG. 5 is a view of a grid support constructed in accordance with the principles of the present invention, illustrating how the grid support couples a grid to a chassis plate.

Now referring to FIGS. 3 and 5 in particular, grid supports 58 are shown therein. Grid supports 58 are each formed as an integral, one-piece molded plastic element, preferably molded of Valox 310-SEO thermoplastic polyester. Three equally spaced grid supports 58 form a secure rigid mounting.

Grid support 58 comprises an elongated member having a first portion 90 for connection to grid 52 and a second portion 92 for connection to chassis plate 34. First portion 90 comprises a generally horizontal slot 94 for receiving a horizontal wire 95 of grid 52 and a vertical slot 96 for receiving the next adjacent, spaced, horizontal wire 97 of grid 52. By referring to FIG. 5, it can be seen that the apexes of slots 94 and 96 lie along a line and are spaced a distance that is substantially equal to the spacing of adjacent horizontal wires 95, 97 which are received within slots 94, 96, respectively. It can also be seen that generally horizontal slot 94 is located along grid support 58 in a direction toward second portion 92.

In order to connect grid support 58 to grid 52, wire 97 is first inserted into slot 96 and the grid support 58 is then pivoted to insert wire 95 into slot 94. The slots are spaced so that the coaction of the horizontal wires 95 and 97 with slots 94 and 96 will be a snap type fit.

Second portion 92 comprises a spring means which forms a retaining member on the top side 98 (FIG. 3) of chassis plate 34. Thus a pair of resilient fingers 99, 100 are provided which operate to squeeze inward when the second portion 92 is pushed upwardly through slot 36. Once fingers 99, 100 have cleared top 98 of chassis plate 34, the fingers 99, 100 will spring outwardly to form retaining shoulders on top side 98 of the chassis plate 34.

It can be seen that grid support 58 is an elongated member which tapers outwardly from the first portion 90 to the second portion 92, to form a relatively large cross-section which provides a stable facing surface against top surface 98 of chassis plate 34. In assembly, the grid supports 58 are first engaged with grid 52 and then snap into chassis plate openings 36. Three supports 58, approximately 120° apart, give a stable, secure mounting to the electrocution grid assembly.

Although illustrative embodiments of the invention have been shown and described, it is to be understood that various modifications and substitutions may be made by those skilled in the art without departing from the novel spirit and scope of the present invention.

What is claimed is:

1. A spacing device for spacing a first wire mesh formed of perpendicularly crossed wires from a second wire mesh formed of perpendicularly crossed wires, which comprises:
   a main body portion having a length that is substantially equal to the distance of spacing of the first mesh from the second mesh;
   a pair of bosses extending axially from opposite ends of said main body portion, each of said bosses defining a slot adapted for receiving a wire from a respective wire mesh with the width of each boss being no greater than the distance between two adjacent wires extending in a direction perpendicular to the slot direction; and
   means for retaining said first wire mesh and said second wire mesh in place with respect to said main body portion.

2. A spacing device as described in claim 1, said main body portion being cylindrical and formed of an electrically insulative material.

3. A spacing device as described in claim 1, said bosses each being identical to the other and being perpendicularly oriented with respect to each other at opposite ends of said main body portion.

4. A spacing device as described in claim 1, each of said bosses having a pair of arcuate opposed sides and a pair of planar opposed sides connecting said arcuate opposed sides, with the slot defined therein extending from one of said planar sides to the opposite planar side, said width of said boss comprising the distance between opposed planar sides.

5. A spacing device as described in claim 1, said retaining means comprising spring washers that are forced over each of said bosses to compress said wire meshes against the ends of said main body portion.

6. A spacing device for spacing a first wire mesh formed of perpendicularly crossed wires from a second wire mesh formed of perpendicularly crossed wires, which comprises:
   a main body portion having a length that is substantially equal to the distance of spacing of the first mesh from the second mesh;
   a pair of bosses extending axially from opposite ends of said main body portion;
   each of said bosses defining a slot adapted for receiving a wire from a respective wire mesh with the width of each boss being no greater than the distance between two adjacent wires extending in a direction perpendicular to the slot direction;
   said bosses each being identical to the other and being perpendicularly oriented with respect to each other at opposite ends of said main body portion;
   each of said bosses having a pair of arcuate opposed sides and a pair of planar opposed sides connecting said arcuate opposed sides, with the slot defined therein extending from one of said planar sides to the opposite planar side, said width of said boss comprising the distance between opposed planar sides; and
   a pair of spring washers for retaining said meshes in place with respect to said main body portion, each of said spring washers being forced over a respective boss to compress the respective mesh against the respective end of the main body portion.

7. Insect electrocution apparatus including a first mesh grid formed of perpendicularly crossed electrically conductive wires and a second mesh grid formed of perpendicularly crossed electrically conductive wires; an insulative spacing device for spacing said first grid from said second grid, which comprises:
   a main body portion having a length that is substantially equal to the distance of spacing of the first mesh grid from the second mesh grid;
   a pair of bosses extending axially from opposite ends of said main body portion, each of said bosses defining a slot adapted for receiving a wire from a respective wire mesh with the width of each boss being no greater than the distance between two adjacent wires extending in a direction perpendicular to the slot direction; and
   means for retaining said first mesh grid and said second mesh grid in place with respect to said main body portion.

8. Insect electrocution apparatus as described in claim 7, said bosses each being identical to the other and being perpendicularly oriented with respect to each other at opposite ends of said main body portion.

9. Insect electrocution apparatus as described in claim 7, each of said bosses having a pair of arcuate opposed sides and a pair of planar opposed sides connecting said arcuate opposed sides, with the slot defined therein extending from one of said planar sides to the opposite planar side, said width of said boss comprising the distance between opposed planar sides.

10. Insect electrocution apparatus as described in claim 7, said retaining means comprising spring washers that are forced over each of said bosses to compress said mesh grids against the ends of said main body portion.

11. Insect electrocution apparatus as described in claim 7, said mesh grids being positioned concentrically and each comprising a ½ inch square mesh.

12. Insect electrocution apparatus as described in claim 7, said spacing device being formed of a steatite ceramic material impregnated with a hydrophobic material.

13. Insect electrocution apparatus including a mesh grid formed of perpendicularly crossed electrically conductive wires mounted to a chassis plate which defines openings therein, the mounting means comprising:
   a grid support formed of insulative material, said grid support comprising an elongated member having a first portion for connection to said grid and a second portion for connection to said chassis plate;
   said first portion defining a pair of generally perpendicularly-oriented slots open to the outside of said first portion with the slots receiving therein adjacent, spaced, horizontal wires of said grid; and
   said second portion extending through a chassis plate opening and including spring means for forming a retaining member on the side of the chassis plate opposite the grid side.

14. Insect electrocution apparatus as described in claim 13, said grid support being formed as an integral one-piece member.

15. Insect electrocution apparatus as described in claim 13, said first portion having a smaller cross-sectional dimension than said second portion.

16. Insect electrocution apparatus as described in claim 13, one of said slots being vertically oriented and opening at an end of said first portion and the other slot being horizontally oriented and opening at a location along the elongated member that is toward said second portion.

17. Insect electrocution apparatus as described in claim 16, the apexes of said slots lying along a line and being spaced a distance that is substantially equal to the spacing of two adjacent horizontal wires received within said slots.

18. Insect electrocution apparatus as described in claim 13, said spring means comprising a pair of resilient fingers that squeeze inward to be inserted into a chassis plate opening in one direction and spring outwardly to form retaining shoulders on said opposite side of the chassis plate.

19. Insect electrocution apparatus as described in claim 13, including a second mesh grid formed of perpendicularly crossed electrically conductive wires, an insulative spacing device for spacing said first-mentioned grid from said second grid, comprising a main body portion having a length that is substantially equal to the distance of spacing of the first mesh grid from the second mesh grid; a pair of bosses extending axially from opposite ends of said main body portion, each of said bosses defining a slot adapted for receiving a wire from a respective wire mesh with the width of each boss being no greater than the distance between two adjacent wires extending in a direction perpendicular to the slot direction; and means for retaining said first mesh grid and said second mesh grid in place with respect to said main body portion.

20. Insect electrocution apparatus including a mesh grid formed of perpendicularly crossed electrically conductive wires mounted to a chassis plate which defines openings therein, the mounting means comprising:

an integral one-piece grid support formed of insulative material, said grid support comprising an elongated member having a first portion for connection to said grid and a second portion for connection to said chassis plate;

said first portion having a smaller cross-sectional dimension than said second portion;

said first portion defining a pair of generally perpendicularly-oriented slots open to the outside of said first portion with the slots receiving therein adjacent, spaced, horizontal wires of said grid;

one of said slots being vertically oriented and opening at an end of said first portion and the other slot being horizontally-oriented and opening at a location along the elongated member that is toward said second portion;

the apexes of said slots lying along a line and being spaced a distance that is substantially equal to the spacing of two adjacent horizontal wires received within said slots; and said second portion extending through a chassis plate opening and including spring means for forming a retaining member on the side of the chassis plate opposite the grid side.

21. Insect electrocution apparatus as described in claim 20, said spring means comprising a pair of resilient fingers that squeeze inward to be inserted into a chassis plate opening in one direction and spring outwardly to form retaining shoulders on said opposite side of the chassis plate.

22. A spacing device for spacing a first wire mesh formed of perpendicularly crossed wires from a second wire mesh formed of perpendicularly crossed wires, which comprises:

a main body portion having a length that is substantially equal to the distance of spacing of the first mesh from the second mesh;

a first boss extending axially from said main body portion, said first boss defining a first directional slot adapted for receiving a first directional wire from said first wire mesh with the first directional width of the first boss being no greater than the distance between two adjacent second directional wires from said first wire mesh that are perpendicular to said first directional wire;

a second boss extending axially from said main body portion in the direction opposite to the first boss, said second boss defining a second directional slot adapted for receiving a second directional wire from said second wire mesh with the second directional width of the second boss being no greater than the distance between two adjacent first directional wires from said second wire mesh that are perpendicular to said second directional wire; and means for retaining said first mesh and said second mesh in place with respect to said main body portion.

* * * * *